United States Patent
Alperovich et al.

[19]

[11] Patent Number: 6,119,014
[45] Date of Patent: Sep. 12, 2000

[54] SYSTEM AND METHOD FOR DISPLAYING SHORT MESSAGES DEPENDING UPON LOCATION, PRIORITY, AND USER-DEFINED INDICATORS

[75] Inventors: Vladimir Alperovich, Dallas; David Boltz, Richardson, both of Tex.

[73] Assignee: Ericsson Inc., Research Triangle Park, N.C.

[21] Appl. No.: 09/053,568

[22] Filed: Apr. 1, 1998

[51] Int. Cl.[7] .............................. H04Q 7/20; H04M 11/10
[52] U.S. Cl. .................... 455/466; 455/412; 455/456; 455/457; 455/566; 340/825.44
[58] Field of Search .................................. 455/412, 558, 455/466, 527, 456, 457, 414, 557, 566; 340/825.44

[56] References Cited

U.S. PATENT DOCUMENTS

| | | | |
|---|---|---|---|
| 4,788,543 | 11/1988 | Rubin | 340/825.44 |
| 5,258,751 | 11/1993 | De Luca et al. | 340/825.44 |
| 5,428,822 | 6/1995 | Helenius et al. | 455/433 |
| 5,539,395 | 7/1996 | Buss et al. | 340/825.44 |
| 5,539,924 | 7/1996 | Grube et al. | 455/509 |
| 5,577,102 | 11/1996 | Koivunen | 455/466 |
| 5,604,921 | 2/1997 | Alanara | 455/186.2 |
| 5,628,051 | 5/1997 | Salin | 455/466 |
| 5,678,179 | 10/1997 | Turcotte et al. | 455/466 |
| 5,682,600 | 10/1997 | Salin | 455/422 |
| 5,687,216 | 11/1997 | Svensson | 455/466 |
| 5,692,032 | 11/1997 | Seppänen et al. | 455/466 |
| 5,787,357 | 7/1998 | Salin | 455/466 |
| 5,819,180 | 10/1998 | Alperovich et al. | 455/465 |
| 5,878,347 | 3/1999 | Joensuu et al. | 455/433 |
| 5,930,239 | 7/1999 | Turcotte | 455/466 |
| 5,946,630 | 8/1999 | Willars et al. | 455/466 |

FOREIGN PATENT DOCUMENTS

| | | | |
|---|---|---|---|
| 0 689 368 A1 | 12/1995 | European Pat. Off. | H04Q 7/22 |
| WO 95/12933 | 5/1995 | WIPO | H04J 3/16 |
| WO 97/41654 | 11/1997 | WIPO | H04H 1/00 |

OTHER PUBLICATIONS

PCT International Search Report dated Jul. 27, 1999.
PCT International Search Report of Application # PCT/US 99/07075, Jul. 1999.

*Primary Examiner*—Fan Tsang
*Assistant Examiner*—Rafael Perez-Gutierrez
*Attorney, Agent, or Firm*—Jenkens & Gilchrist, P.C.

[57] ABSTRACT

A telecommunications system and method is disclosed for organizing SMS messages sent to a mobile terminal based on the location of the mobile terminal or the time of delivery of the SMS messages. Thus, when a subscriber sends a short message to another subscriber, the originating subscriber can specify the time of delivery of the message. In addition, the originating subscriber can specify the priority associated with the message, e.g., the SMS message can have an indication of priority one, which indicates to the receiving subscriber that the message is urgent. Furthermore, the originating subscriber can also specify that the message is to be delivered only when the called subscriber is in a certain location. The receiving subscriber can also control the display of the SMS messages by moving the received SMS messages to an action list, and then specifying when and/or where the SMS messages should be displayed again.

7 Claims, 4 Drawing Sheets

SYSTEM AND METHOD FOR DISPLAYING SHORT MESSAGES DEPENDING UPON LOCATION, PRIORITY, AND USER-DEFINED INDICATORS

BACKGROUND OF THE PRESENT INVENTION

1. Field of the Invention

The present invention relates generally to telecommunications systems and methods for delivering Short Message Service (SMS) messages, and specifically to organizing SMS messages based on the location of the receiving mobile terminal or on the time of delivery of the SMS message.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system in use today, and described in more detail herein.

With reference now to FIG. 1 of the drawings, there is illustrated a GSM Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12 is divided into a number of cells 22.

Mobile Station (MS) 20 is the physical equipment, e.g., a car phone or other portable phone, used by mobile subscribers to communicate with the cellular network 10, each other, and users outside the subscribed network, both wireline and wireless. The MS 20 may also include a Subscriber Identity Module (SIM) card 13, or other memory, which provides storage of subscriber related information, such as a subscriber authentication key, temporary network data, and service related data (e.g. language preference).

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

With reference now to FIG. 2 of the drawings, text messages, containing up to 160 alpha numerical characters, can be sent to and from MSs 200, using the Short Message Service (SMS) 210. SMS 210 utilizes a Service Center 220, which stores and forwards short messages to MSs 200. A SMS 210 message can be sent from the Service Center 220 to the MS 200 or from the MS 200 to the Service Center 220.

The mobile terminated SMS 210 transfers a short message from the Service Center 220 to the MS 200. In addition, information about the delivery of the short message is returned to the Service Center 220. This information is either a delivery report, which confirms the delivery of the message to a recipient, or a failure report, which informs the originator that the short message was not delivered and the reason why. If the information is a failure report, the originator has the ability to order retransmission later.

A mobile terminated SMS message typically originates by a user 240 sending a message to the Service Center 220, which then forwards the message to the SMS Gateway Mobile Switching Center (SMS-GMSC) 250. Thereafter, the SMS-GMSC 250 interrogates the HLR 260 for routing information pertaining to the designated MS 200. The HLR 260 returns this routing information to the SMS-GMSC 250, which can then route the message to the MSC/VLR 270 serving the location area (LA) 205 that the MS 200 is in. If the MS 200 is in IDLE mode (not in use), the MS 200 is paged, and a connection is set up between the MS 200 and the network 270, as in the normal call setup case. The MSC/VLR 270 then delivers the SMS message 210 to the MS 200. SMS messages 210 are preferably transmitted on the allocated signaling channel. However, if the MS 200 is in busy mode (in use), the SMS message 210 will be transmitted on the Slow Associated Control Channel (SACCH). In that case, no paging, call setup, or authentication need to be performed.

After the MSC/VLR 270 send the SMS message 210 to the MS, a delivery report is sent from the serving MSC/VLR 270 to the Service Center 220. If delivery of the SMS message 210 was not successful, the HLR 260 is informed, and a failure report is sent to the Service Center 220. In addition, if the delivery was unsuccessful, a Messages Waiting service 215 within the Service Center 220 can optionally provide the HLR 260 and the serving MSC/VLR 270 with the information that there is a message in the originating Service Center 220 waiting to be delivered to the MS 200. Once the MS 200 becomes available for receipt of the SMS message 210, the HLR 260 informs the Service Center 220 and the SMS message 210 is sent again. The mobile terminated SMS message 210 can be input to the Service Center 220 by a variety of sources, e.g., speech, telex or facsimile.

A mobile originated SMS message can also be submitted by the MS 200 to the Service Center 220. The MS 200 first establishes a connection to the network (serving MSC/VLR 270), as in the case of a normal call setup. However, it should be noted that if the MS is in busy mode, a connection already exists. Once a connection is made with the serving MSC/VLR 270 and the authentication of MS 200 is confirmed, the MS 200 can send the SMS message to the Service Center 220 via the serving MSC/VLR 270. The Service Center 220 in turn forwards the SMS message 210 to its destination, which could be another MS (not shown) or a user 240 in the fixed network, the latter of which is illustrated in FIG. 2. Once the SMS message 210 is delivered to the end user 240, either a delivery report or a failure report is sent to the Service center 220.

The SMS messages 210 are becoming popular because, at present, the cost of sending a SMS message 210 is lower than the cost of a phone call. For example, a SMS message 210 sent to a MS 200 can be a reminder or a "to do" message, such as "buy milk on the way home", or "call your mother". However, there is currently no existing way to organize such messages based on the location of the MS 200 or the time of delivery of the SMS messages 210.

It is, therefore, an object of the present invention to organize SMS messages sent to a mobile terminal based on the location of the mobile terminal or the time of delivery of the SMS messages.

SUMMARY OF THE INVENTION

The present invention is directed to telecommunications systems and methods for organizing SMS messages sent to a mobile terminal based on the location of the mobile terminal or the time of delivery of the SMS messages. Thus, when a subscriber sends a short message to another subscriber, the originating subscriber can specify the time of delivery of the message, including the time(s) to repeat delivery of the message. In addition, the originating subscriber can specify the priority associated with the message, e.g., the SMS message can have an indication of priority one, which indicates to the receiving subscriber that the message is urgent. Furthermore, the originating subscriber can also specify that the message is to be delivered only when the called subscriber is in a certain location. The receiving subscriber can also control the display of the SMS messages by moving the received SMS messages to an action list, and then specifying when and/or where the SMS messages should be displayed again.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
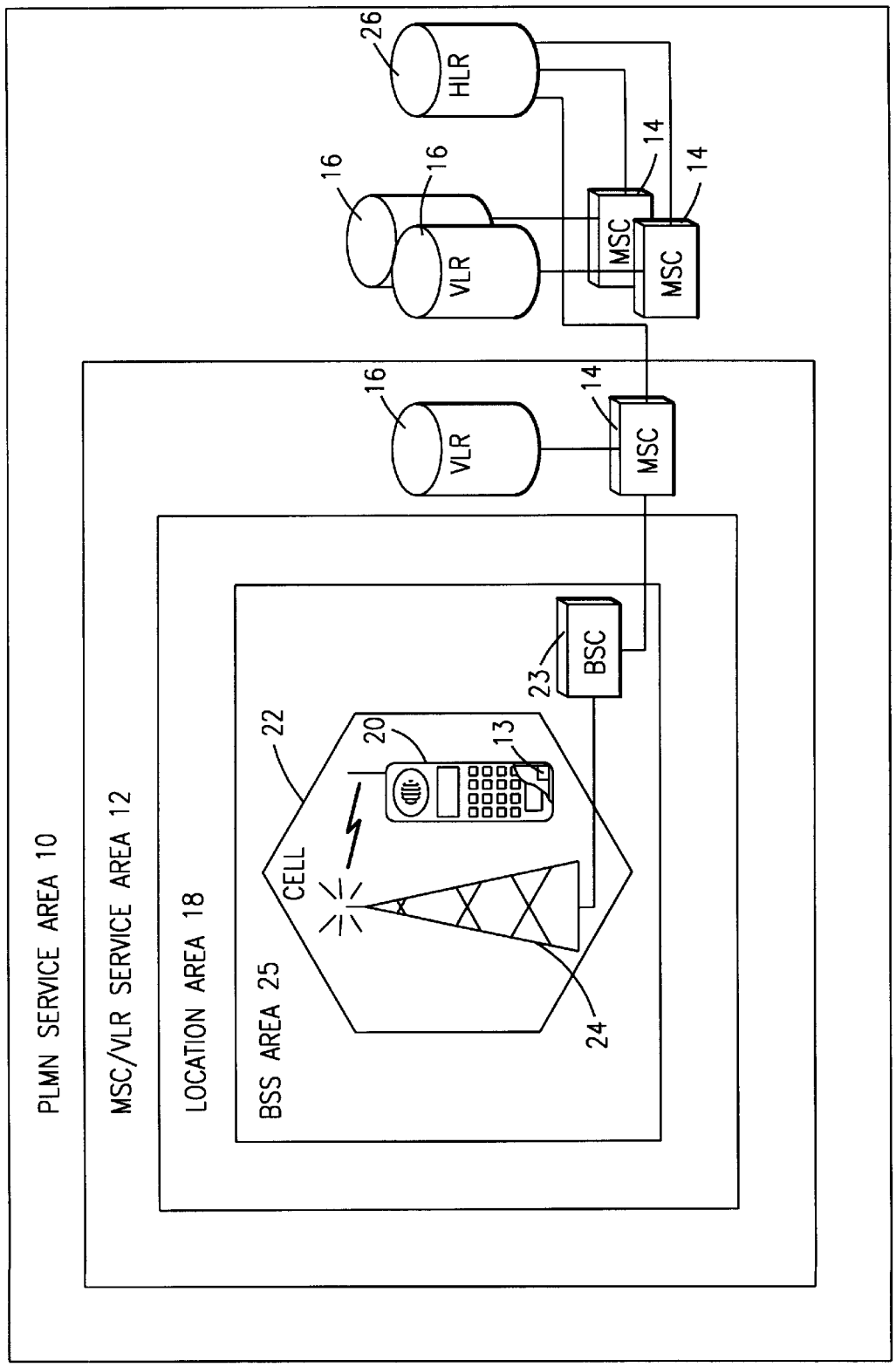
FIG. 1 is a block diagram of a conventional terrestrially-based wireless telecommunications system.
Figure 2:
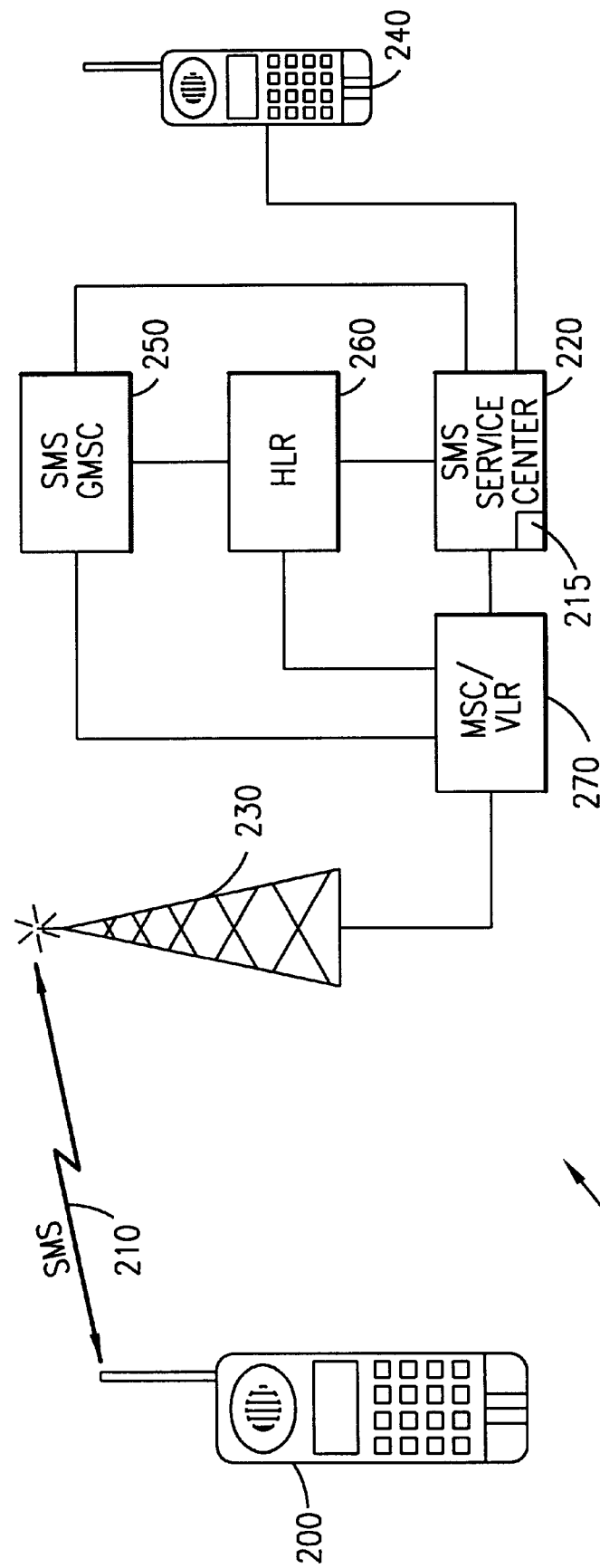
FIG. 2 illustrates the delivery of Short Message Service (SMS) messages to and from a mobile terminal.
Figure 3:
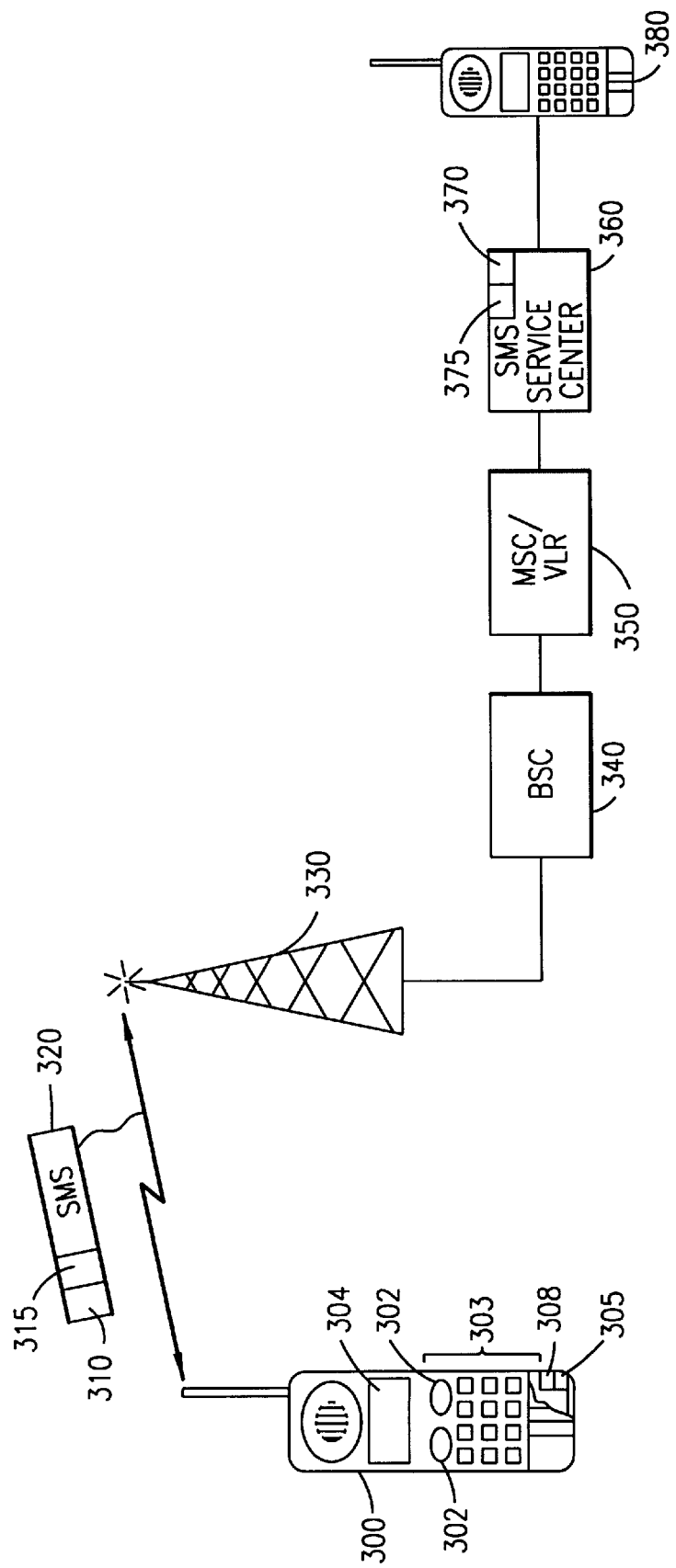
FIG. 3 shows the organization of SMS messages based upon the priority associated with the SMS message.

With reference now to FIG. 3 of the drawings, an originating subscriber 380 can send a Short Message Service (SMS) message 320 with a priority indication 310 to a receiving Mobile Station (MS) 300, which informs the subscriber associated with the receiving MS 300 of the urgency of the received SMS message 320. A Subscriber Identity Module (SIM) card 305, or other memory, within the MS 300 can have a new SMS-organizational (SMS-org) application 308, which receives the SMS messages 320 and associated priorities 310, sorts the SMS messages 320 by priority 310 and displays the SMS messages 320 according to the priorities 310 indicated. The SMS-org application 308 can also store the SMS messages 320 according to priority 310 within the SIM card 305, or other memory, for later retrieval by the MS 300. For example, a taxi company could send a SMS message 320 to one of its taxi drivers instructing the taxi driver to pick up a group of people at a certain time. Depending upon the time of delivery of the SMS message 320, the taxi company can assign priority one 310, if the taxi driver must pick them up immediately, priority two 310 if the taxi driver has other fares to handle before the pick up time, or priority three 310 if the taxi driver is to pick them up at his convenience or on the next day.

The SMS messages 320 are forwarded from the originating subscriber 380 to the MS 300 via a SMS Service Center 360, a serving Mobile Switching Center/Visitor Location Register (MSC/VLR) 350, a Base Station Controller (BSC) 340 and a Base Transceiver Station (BTS) 330. The MS 300 receives the SMS message 320, along with any other SMS messages (not shown), and stores the messages 320 within the SIM card 305, or other memory, according to the associated priorities 310. When the subscriber reads the SMS messages 320, e.g., by pressing a function key 302 on a keypad 303 of the MS 300, the messages 320 will be displayed on a display 304 according to priority 310. Thus, the subscriber can request that only priority one 310 messages 320 be displayed, or can request all messages 320 to be displayed with priority one 310 messages 320 listed first. In addition, for urgent messages 320, such as priority one 310 messages 320, the MS 300 can beep at regular intervals to inform the subscriber that an urgent SMS message 320 is waiting. Once the subscriber reads the SMS message 320, the MS 300 can stop beeping and the subscriber can either erase the SMS message 320 from memory 305 or store the SMS message 320 within the memory 305 for later retrieval by the subscriber.

Furthermore, the originating subscriber 380, e.g., the taxi company, can send the SMS message 320 with a reminder indicator 315, which instructs the SMS-org application 308 to display the SMS message 320 at predefined intervals of time, e.g., every hour for six hours, or instructs the SMS-org application 308 to display the SMS message 320 immediately and then display a reminder message 320 at a certain time(s) . In addition, the originating subscriber 380 can change the priority 310 of the SMS message 320 based upon the time of delivery. For example, an SMS message 320 can have a priority two indicator 310 associated with it the first time the message 320 is sent, and a priority one indicator 310 associated with it when it is sent a second time (reminder message 320).

Alternatively, the SMS Service Center 360 can have a SMS-org application 370 located therein, which can receive the SMS messages 320 and associated reminder indicators 315 from the originating subscriber 380 and store them in a memory 375 within the SMS Service Center 360 until the time associated with the reminder indicator is reached. Thereafter, the SMS Service Center 360 can send the SMS message 320 to the MS 300 for display on the MS display 304.

If an SMS message 320 is sent from a subscriber 380 that does not have the ability to establish a priority indicator 310, the SMS message 320 will be delivered to the receiving MS 300 without the priority indicator 310. The SMS-org application 308 can then receive the SMS message 320 and display it without a priority indicator 310 at the end of the priority messages 320.

In addition, for SMS messages 320 with priority indicators 310, the SMS-org application 308 can determine the originating subscriber's 380 identity, and if the originating subscriber 380 is not authorized to establish a priority indicator 310, the SMS-org application 308 can discard the priority 310 and display the message 320 at the end of the priority messages 320. Alternatively, the inclusion of a priority indicator 310 with the SMS message 320 can be password protected by the originating subscriber 380, thus preventing any unauthorized priority indicators 310 with delivered SMS messages 320.

Figure 4:
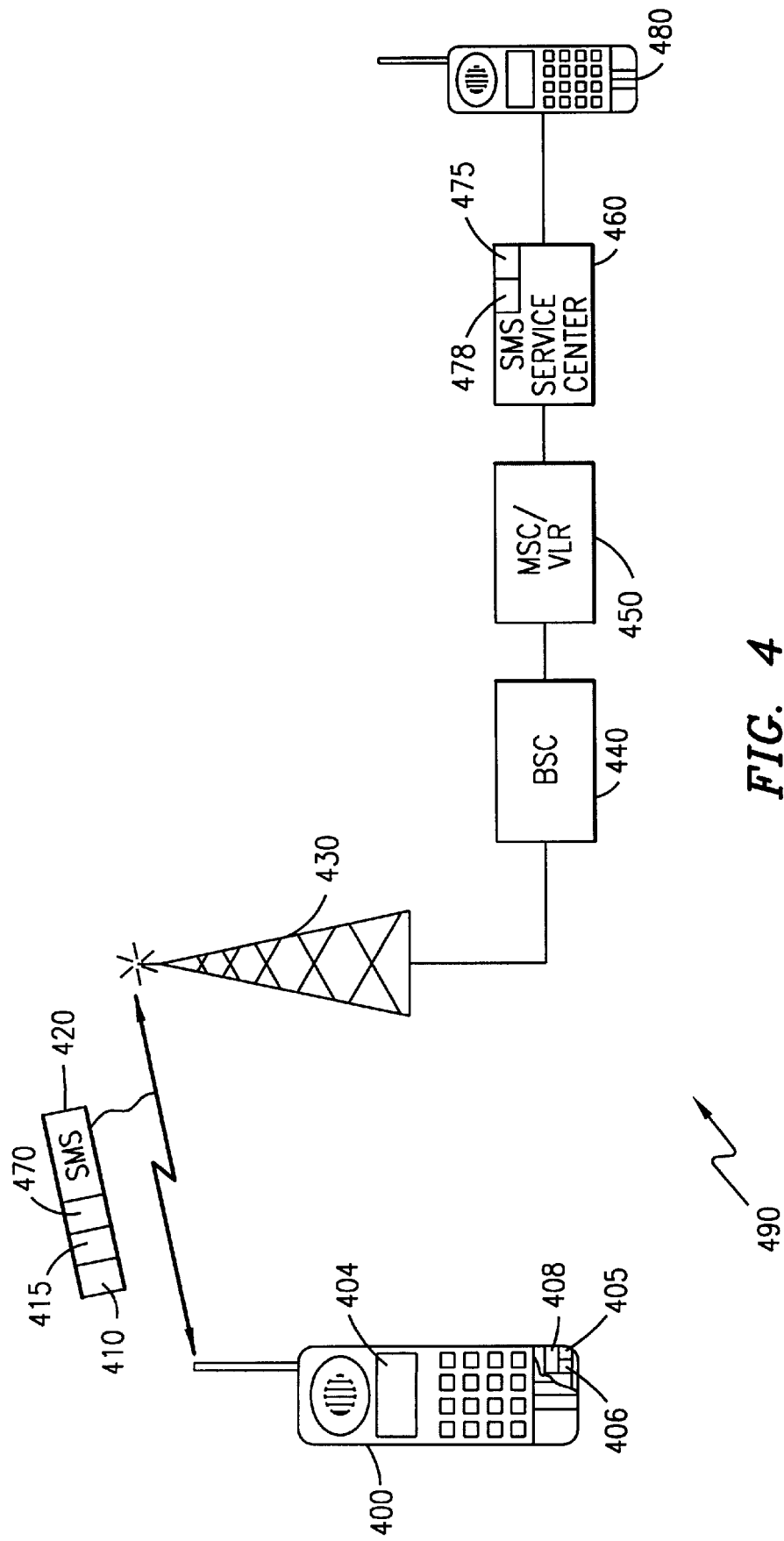
FIG. 4 shows the organization of SMS messages based upon the location of the mobile terminal.

With reference now to FIG. 4 of the drawings, an originating subscriber 480 can send an SMS message 420 having associated location information 470, instead of or in addition to a priority indicator 410, to a MS 400. The location information 470 can include a location area, a set of coordinates, e.g., latitude and longitude, or a specific geographical reference point, which indicates where the MS 400 should be when the SMS message 420 is displayed on the display 404 of the MS 400.

In one embodiment, the SMS-org application 408 can store the SMS message 420 in the SIM card 405, or other memory, along with location information 470 and handling instructions until the location of the MS 400 corresponds with the location information 470 associated with the SMS message 420. When the MS 400 changes location, such as when the MS 400 moves to a different Location Area (LA) 490, all location dependent messages 420 in the SIM card 405 are checked. For example, if the location information 470 is a location area 490, once the MS 400 registers with the MSC/VLR 450 for the location area 490 corresponding to the location information 470, the SMS-org application 408 will display the SMS message 420 on the MS display 404 to the subscriber.

Alternatively, the SMS Service Center 460 can have an SMS-org application (node) 475, which stores the SMS message 420 within a memory 478 and periodically checks the location of the MS 400. Once the MS 400 is within the location area 490 corresponding with the location information 470, the SMS Service Center 460 can send the SMS message 420 to the serving MSC/VLR 450, which can then forward the SMS message 420 to the MS 400 via the serving BSC 440 and BTS 430.

However, if the location information 470 is a set of coordinates, or a specific geographical reference point, e.g., the corner of 5th Street and 16th Street, the SMS-org application 408 or the SMS Service Center 460 will have to periodically position the MS 400, as is well understood in the art, depending upon the detail of the location information 470. Once the position of the MS 400 corresponds to the location information 470 within a predetermined allowable distance, e.g., within one mile, the SMS message 420 is either displayed on the MS display 404 by the SMS-org application 408, or sent to the MS 400 by the SMS Service Center 460.

In addition, the originating subscriber 480 can send the SMS message 420 with instructions to deliver it immediately to the MS 400 regardless of the location of the MS 400, and with a reminder indicator 415 and location indicator 470, which instructs the SMS Service Center 460 to deliver a reminder SMS message 420 at a later time when the MS 400 is at a specific location. For example, the originating subscriber 480 could send an SMS message 420 saying "Don't forget to stop at the store on the way home," which is delivered immediately and a reminder message 420, which is delivered when the MS 400 enter the location area 490 for the store. Alternatively, both SMS messages 420 (immediate and reminder) can be sent to the MS 400 immediately, and the SMS-org application 408 can display the first message 420 immediately and store the reminder message based upon the reminder indicator 415 and the location indicator 470 until the MS 400 has entered the location area 490 for the store.

Once the subscriber views the SMS message 420, the subscriber has the option of erasing the SMS message 420 from memory 405, storing the SMS message 420 in memory 405 for later retrieval, or moving the SMS message 420 to an action list 406 within the SIM card 405, or other memory. The SIM card 405 can then store the SMS message 420 until a time or location defined by the receiving subscriber occurs. Thus, the receiving subscriber can view the SMS message 420 and place it in the action list 406, instructing the SMS-org application 408 to display a reminder message when a certain time occurs or when the MS 400 has entered a specific location area 490.

As will be recognized by those skilled in the art, the innovative concepts described in the present application can be modified and varied over a wide range of applications. Accordingly, the scope of patented subject matter should not be limited to any of the specific exemplary teachings discussed.

For example, it should be understood that the SMS organization system and method described herein can be applied to any wireless telecommunications system which utilizes short messages, including, but not limited to, Global System for Mobile Communications (GSM) networks, Personal Communications System (PCS) networks, AMPS networks and D-AMPS networks.

What is claimed is:

1. A telecommunications system for displaying a short message received by a given one of a plurality of mobile terminals in wireless communication with a mobile switching center, said telecommunications system comprising:

an organizational node in communication with said given mobile terminal and said mobile switching center, said organizational node being adapted to receive said short message and a location indicator associated with said short message from an originating subscriber, said location indicator being defined by said originating subscriber and associated with a location within said telecommunications system, said organizational node further being adapted to determine a position of said given mobile terminal within said telecommunications system;

a memory connected to said organizational node for storing said short message and said location indicator, said short message being displayed on a display on said given mobile terminal when said given mobile terminal is within said location associated with said location indicator; and an action database within said given mobile terminal, said short message being moved to said action database when said short message is displayed on said display of said given mobile terminal, said short message within said action database further having an additional indicator associated therewith, said additional indicator being defined by a user of said given mobile terminal after said short message is displayed on said given mobile terminal, said additional indicator indicating a time for subsequent display of said moved short message on said display of said given mobile terminal.

2. A telecommunications system for displaying a short message received by a given one of a plurality of mobile terminals in wireless communication with a mobile switching center, said telecommunications system comprising:

an organizational node in communication with said given mobile terminal and said mobile switching center, said organizational node being adapted to receive said short message and a location indicator associated with said short message from an originating subscriber, said location indicator being defined by said originating subscriber and associated with a location within said telecommunications system, said organizational node further being adapted to determine a position of said given mobile terminal within said telecommunications system;

a memory connected to said organizational node for storing said short message and said location indicator, said short message being displayed on a display on said given mobile terminal when said given mobile terminal is within said location associated with said location indicator; and an action database within said given mobile terminal, said short message being moved to said action database when said short message is displayed on said display of said given mobile terminal, said short message within said action database further having an additional indicator associated therewith, said additional indicator being defined by a user of said given mobile terminal after said short message is displayed on said given mobile terminal, said additional indicator indicating a subsequent location, said moved short message being subsequently displayed on said display of said given mobile terminal when said position is within said subsequent location.

3. A method for displaying a short message received by a given one of a plurality of mobile terminals in wireless communication with a mobile switching center within a cellular network, said method comprising the steps of:

receiving, by an organizational node in communication with said given mobile terminal and said mobile switching center, said short message and a location indicator associated with said short message from an originating subscriber, said location indicator being defined by said originating subscriber and associated with a location within said cellular network;

storing said short message and said location indicator within a memory connected to said organizational node;

determining a position of said given mobile terminal within said cellular network;

displaying, on a display on said given mobile terminal, said short message when said location of said given mobile terminal is within said location associated with said location indicator;

moving said short message displayed on said display of said given mobile terminal along to an action database within said given mobile terminal; and storing an additional indicator associated with said moved short message along with said short message in said action database, said additional indicator being defined by a user of said given mobile terminal, said additional indicator indicating a subsequent time for displaying said moved short message on said display of said given mobile terminal.

4. A method for displaying a short message received by a given one of a plurality of mobile terminals in wireless communication with a mobile switching center within a cellular network, said method comprising the steps of:

receiving, by an organizational node in communication with said given mobile terminal and said mobile switching center, said short message and a location indicator associated with said short message from an originating subscriber, said location indicator being defined by said originating subscriber and associated with a location within said cellular network;

storing said short message and said location indicator within a memory connected to said organizational node;

determining a position of said given mobile terminal within said cellular network;

displaying, on a display on said given mobile terminal, said short message when said location of said given mobile terminal is within said location associated with said location indicator;

moving said short message displayed on said display of said given mobile terminal along to an action database within said given mobile terminal; and storing an additional indicator associated with said moved short message along with said short message in said action database, said additional indicator being defined by a user of said given mobile terminal, said additional indicator indicating a subsequent location, said moved short message being subsequently displayed on said display of said given mobile terminal when said position is within said subsequent location.

5. A mobile terminal in wireless communication with a cellular network, said mobile terminal being adapted to receive a short message from said cellular network, said mobile terminal comprising:

a display configured to display said short message;

a user interface adapted to receive an indicator from a mobile subscriber associated with said mobile terminal after said short message is displayed on said display;

an action database adapted to store said displayed short message and said indicator, said indicator being a subsequent time for subsequent display of said short message on said display or a location within said cellular network that said mobile terminal must be located in to subsequently display said short message on said display; and an organizational application configured to receive said short message, display said short message on said display, receive said indicator, store said displayed short message and said indicator within said action database, and either determine a current time and display said short message on said display again when said current time equals said subsequent time or determine a position of said mobile terminal within said cellular network and display said short message on said display again when said position is within said location.

6. The mobile terminal of claim 5, further comprising:

a memory, said action database and said organizational application being within said memory.

7. A method for subsequently displaying a short message received by a mobile terminal in wireless communication with a cellular network, said method comprising the steps of:

first displaying said short message on a display of said mobile terminal;

receiving an indicator from a user of said mobile terminal;

storing said short message and said indicator within an action database within said mobile terminal, said indicator being a subsequent time for subsequent display of said short message on said display or a location within said cellular network that said mobile terminal must be located in to subsequently display said short message on said display; and second displaying said short message on said display in response to either a determination that a current time equals said subsequent time or a determination that a current position of said mobile terminal is within said location.

* * * * *